(12) United States Patent
Lyn-Shue

(10) Patent No.: US 9,184,835 B2
(45) Date of Patent: Nov. 10, 2015

(54) MULTIPLE WIRELESS CONNECTIVITY HUB

(71) Applicant: Cellco Partnership, Basking Ridge, NJ (US)

(72) Inventor: Denise Nicole Lyn-Shue, Cambridge, MA (US)

(73) Assignee: Cellco Partnership, Basking Ridge, NJ (US)

( * ) Notice: Subject to any disclaimer, the term of this patent is extended or adjusted under 35 U.S.C. 154(b) by 100 days.

(21) Appl. No.: 13/954,282

(22) Filed: Jul. 30, 2013

(65) Prior Publication Data

US 2015/0037040 A1 Feb. 5, 2015

(51) Int. Cl.
| | |
|---|---|
| *H04B 7/00* | (2006.01) |
| *H04B 10/11* | (2013.01) |
| *H04L 12/28* | (2006.01) |
| *H04L 12/66* | (2006.01) |
| *H04W 88/10* | (2009.01) |
| *H04B 1/68* | (2006.01) |
| *H04L 29/06* | (2006.01) |

(52) U.S. Cl.
CPC ............ *H04B 10/11* (2013.01); *H04L 12/2803* (2013.01); *H04L 12/66* (2013.01); *H04W 88/10* (2013.01); *H04L 69/18* (2013.01)

(58) Field of Classification Search
CPC .......... H04B 1/17253; H04B 1/72533; H04W 88/06; H04W 92/04
USPC ..................... 455/41.2–41.3, 552.1
See application file for complete search history.

(56) References Cited

U.S. PATENT DOCUMENTS

2010/0297943 A1* 11/2010 Kaplan et al. ................ 455/41.2
2014/0068116 A1* 3/2014 Kim et al. ...................... 710/33

* cited by examiner

*Primary Examiner* — Lee Nguyen

(57) ABSTRACT

A hub device detects, using a plurality of different wireless communication interfaces, the presence of a plurality of different wireless devices, wherein, initially, each of the plurality of different wireless devices implements an unknown type of wireless connectivity. The hub device detects a type of wireless connectivity, of a plurality of different types of wireless connectivity, for each of the plurality of different wireless devices whose presence is detected, and causes a connection to be established to the plurality of different wireless devices, via selected ones of the plurality of different wireless communication interfaces, based on the type of wireless connectivity detected for each of the plurality of different wireless devices. The hub device forwards data received from one of the plurality of different wireless devices to another of the plurality of different wireless devices using two different ones of the plurality of different types of wireless connectivity.

24 Claims, 14 Drawing Sheets

MULTIPLE WIRELESS CONNECTIVITY HUB

BACKGROUND

Many different types of electronic devices have wireless communication capability. Typically, those devices may have wireless communication capability via a single type of wireless connectivity. For example, a cellular telephone may be capable of communicating with other telephones via a wireless channel of a cellular network; a set-top box may be capable of communicating with remote control devices via infrared signals; a laptop computer may be capable of communicating with the Internet via Wi-Fi; and a television may be capable of communicating via an internal Near Field Communication (NFC) interface.

In a local area, such as, for example, in a home or a place of business, each of the wireless devices may not, however, have the capability to communicate with every one of the other wireless devices due to incompatible types of wireless connectivities. Therefore, a television having only NFC communication capability may be incapable of communicating with a tablet computer having only Wi-Fi communication capability, or a set-top box having only infrared wireless communication capability may be incapable of communicating with a cellular telephone having only cellular network connectivity.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A data hub having the capability of communicating via multiple different types of wireless connectivities is described herein that enables different types of external wireless devices, having incompatible types of wireless communication abilities, to communicate with one another via the data hub. The hub described herein supports communication via multiple different types of wireless connectivity, such as, for example, Near Field Communication, infrared, ZigBee, BlueTooth, cellular network, Ultra Wide Band (UWB), WiMAX, and/or Wi-Fi connectivity. The hub may automatically detect the presence of the external wireless devices that use any of the multiple different types of wireless connectivity, and may configure and establish a connection to the wireless devices whose presence is detected. The hub may then serve as a data relay such that the multiple wireless devices may transfer data to one another using what would otherwise be incompatible wireless connectivites if the wireless devices attempted to connect with one another directly. For example, a first wireless device having a first type of wireless connectivity may send data, destined for a second wireless device, via the first type of wireless connectivity to the hub. Upon receipt of the data, the hub may relay the data to the destination second wireless device via a second type of wireless connectivity supported by the second wireless device, but not supported by the first wireless device. The hub described herein may, therefore, serve as an "any-to-any" wireless relay device that can be used, for example, within a home entertainment system, a home alarm system, or a smart home system.

Figure 1A:
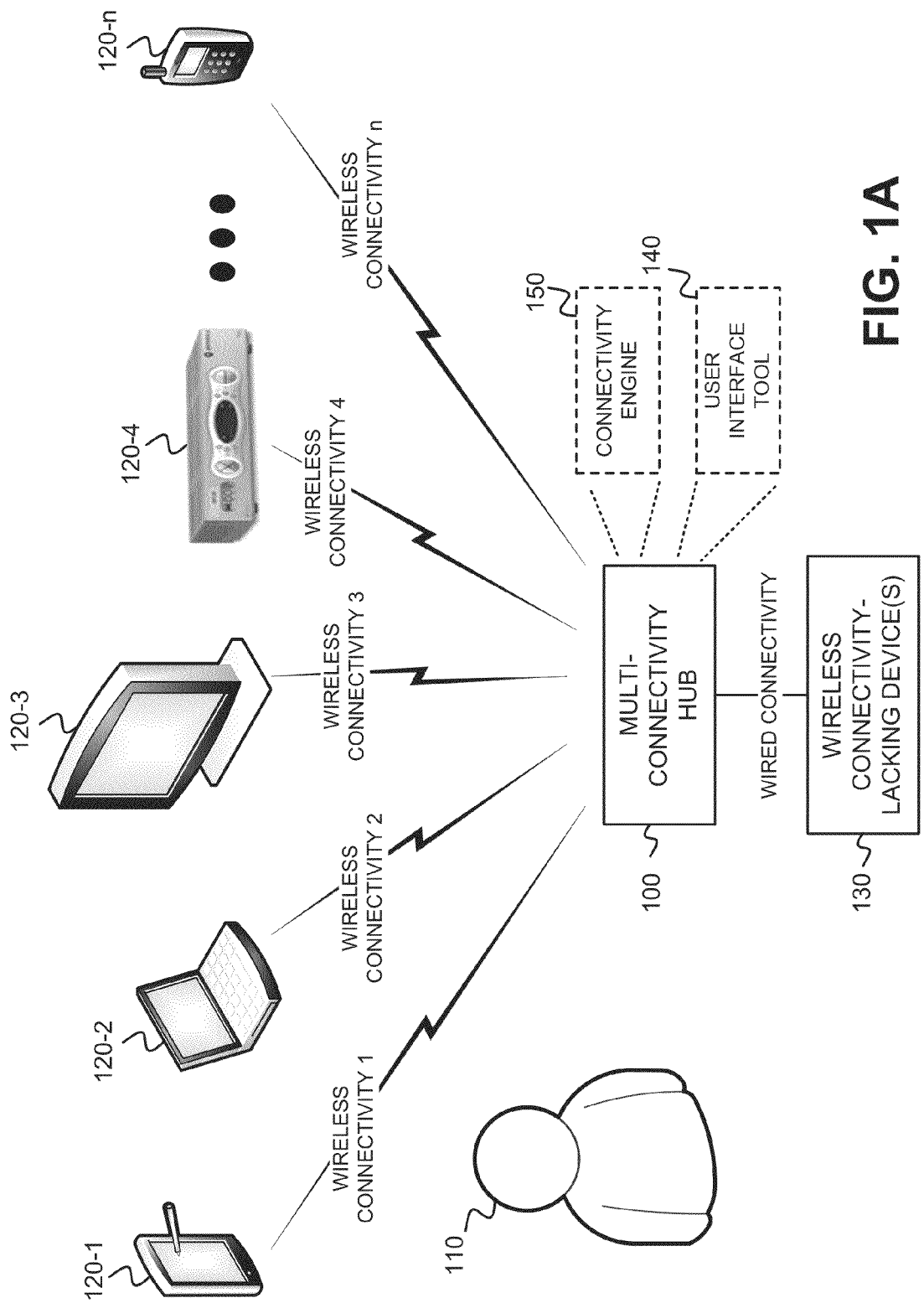
FIGS. 1A and 1B illustrate an overview of the use of a multi-connectivity hub for enabling the communication of data between multiple different types of wireless devices using multiple different types of wireless connections.
Figure 1B:
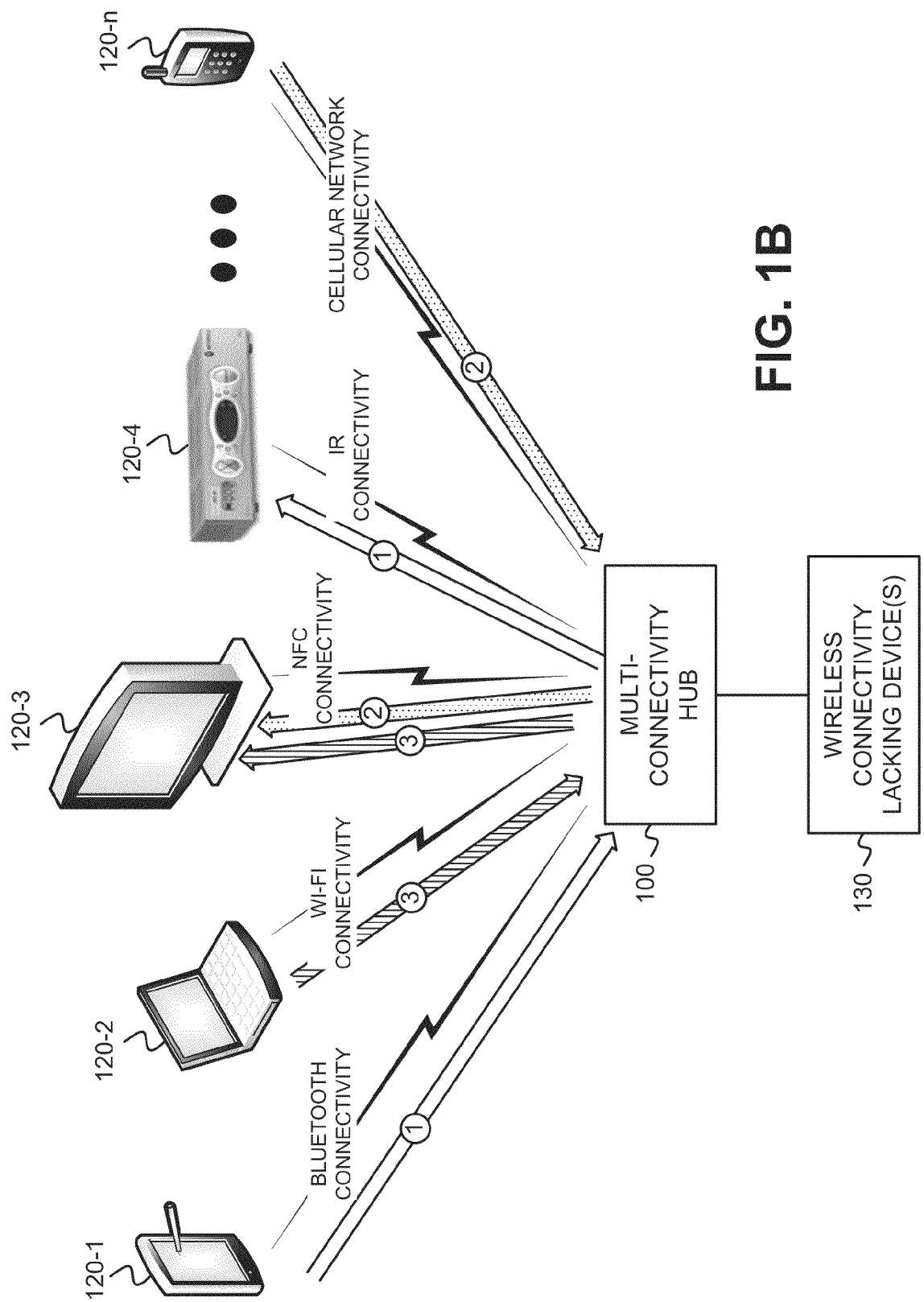

FIGS. 1A and 1B illustrate an overview of the use of a multi-connectivity hub 100 for enabling the communication of data between multiple different types of wireless devices using multiple different types of wireless connectivities. As shown in FIG. 1A, multi-connectivity hub 100 may be operated or used by a user 110 that deploys hub 100 for the purpose of detecting the presence of wireless devices 120-1 through 120-n (referred to generically and individually herein as "device 120"; n is a positive integer greater than or equal to two), for detecting the available wireless connectivity for connecting to each of wireless devices 120-1 through 120-n, and for relaying data between each of wireless devices 120-1 through 120-n.

Each of wireless devices 120-1 through 120-n may include devices that incorporate one or more different types of wireless communication technologies, such as, for example, Near Field Communication (NFC), BlueTooth, BlueTooth low energy, Digital Living Network Alliance (DLNA), infrared, cellular network, UWB, WiMAX, Wi-Fi, Wi-Fi Direct, and ZigBee communication technologies. Wireless devices 120-1 through 120-n may include other types of wireless communication technologies not explicitly described herein. In the specific example depicted in FIG. 1A, wireless device 120-1 includes a wireless tablet computer, wireless device 120-2 includes a wireless laptop computer, wireless device 120-3 includes a television (TV), wireless device 120-4 includes a set-top box (STB), and wireless device 120-n includes a cellular telephone (e.g., a "smartphone"). Other types of wireless devices, different than those shown in FIG. 1A, may, however, be used with hub 100.

As shown in FIG. 1A, hub 100 may include a user interface tool 140 and a connectivity engine 150 to permit interaction by user 110 for activating hub 100 to detect available wireless connections, such as availability of wireless connectivity 1 for connecting to wireless device 120-1, wireless connectivity 2 for connecting to wireless device 120-2, wireless connectivity 3 for connecting to wireless device 120-3, wireless connectivity 4 for connecting to wireless device 120-4 and/or wireless connectivity n for connecting to wireless device 120-n. Hub 100 may additionally connect, via a wired connection(s), to one or more devices 130 that lack wireless connectivity capabilities. The wireless connections between wireless devices 120 and hub 100 may include at least two different types of connectivity, such as, for example, at least two different ones of NFC connectivity, BlueTooth connectivity, infrared connectivity, cellular network connectivity, UWB connectivity, WiMAX connectivity, Wi-Fi (e.g., IEEE 802.11) connectivity, ZigBee connectivity, etc. In one embodiment, wireless connectivities 1 through n may include at least one of NFC connectivity, infrared connectivity, and ZigBee connectivity and one or more of BlueTooth connectivity, cellular network connectivity, and Wi-Fi connectivity.

Multi-connectivity hub 100, after detecting the presence of wireless devices 120-1 through 120-n and determining available wireless connectivities for each of wireless devices 120-1 through 120-n, may act as a relay hub for forwarding data from one connected wireless device to another connected wireless device, as shown in further detail in FIG. 1B below. Each of wireless devices 120-1 through 120-n may have an awareness of each other such that one device 120 may send data destined for another device 120 using hub 100 as a relay point. In some embodiments, multi-connectivity hub 100 may be a component of a larger system, such as, for example, a home media system, a security system, or a "smart house" system.

FIG. 1B depicts an example of multi-connectivity hub 100 forwarding data from one wireless device, via a first type of wireless connectivity, to another wireless device, via a second type of wireless connectivity. As shown in the specific example of FIG. 1B, tablet computer 120-1 may send data (identified with a 1 inside a circle), which is destined for STB 120-4, to hub 100 via BlueTooth connectivity. Upon receipt of the data from tablet computer 120-1 via BlueTooth connectivity, hub 100 may forward the data (shown as a 1 within a circle) to the destination STB 120-4 via IR connectivity.

As further shown in FIG. 1B, cellular telephone 120-n may send data (identified with a 2 inside a circle), which is destined for TV 120-3, to hub 100 via cellular network connectivity. Upon receipt of the data from cellular telephone 120-n via cellular network connectivity, hub 100 may forward the data (shown as a 2 within a circle) to the destination TV 120-3 via NFC connectivity.

As additionally shown in FIG. 1B, laptop computer 120-2 may send data (identified with a 3 inside a circle), which is destined for TV 120-3, to hub 100 via Wi-Fi connectivity. Upon receipt of the data from laptop computer 120-2 via Wi-Fi connectivity, hub 100 may forward the data (shown as a 3 within a circle) to the destination TV 120-3 via NFC connectivity.

Figure 2:
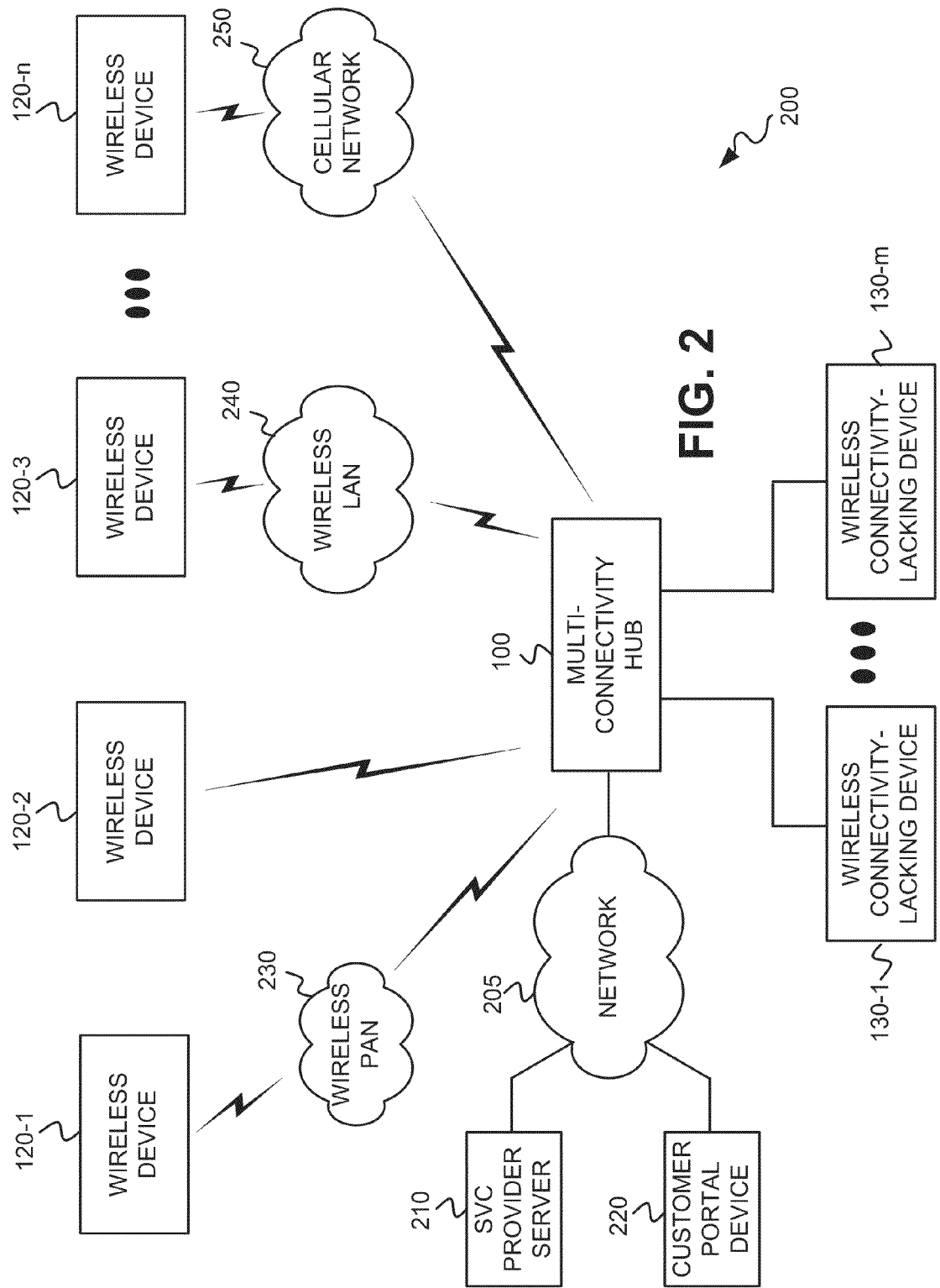
FIG. 2 depicts an exemplary network environment in which the multi-connectivity hub of FIGS. 1A and 1B enables the communication of data between multiple different types of wireless devices using multiple different types of wireless connections.

FIG. 2 depicts an exemplary network environment 200 in which multi-connectivity hub 100 enables the communication of data between multiple different types of wireless devices using multiple different types of wireless connections. As shown in FIG. 2, network environment 200 may include multi-connectivity hub 100, wireless devices 120-1 through 120-n, wireless connectivity-lacking devices 130-1 through 130-m (where m is greater than or equal to one), network 205, service (SVC) provider server 210, customer portal device 220, wireless personal area network (PAN) 230, wireless local area network (LAN) 240, and cellular network 250.

Multi-connectivity hub 100 may, as described further herein, include a device that incorporates multiple different types of wireless communication interfaces for acting as a hub for relaying data from one wireless device to another wireless device. The multiple different types of wireless communication interfaces may include, for example, a NFC communication interface, a BlueTooth communication interface, an infrared communication interface, a UWB communication interface, a WiMAX communication interface, a cellular network communication interface, a Wi-Fi (e.g., IEEE 802.11) communication interface, a ZigBee communication interface, etc.

Each of wireless devices 120-1 through 120-n may include any type of electronic device that further includes a wireless communication interface which may communicate via a wireless connection. For example, each of wireless devices 120-1 through 120-n may include a digital media playing device (e.g., a MP3 player), a cellular telephone (e.g., a smart phone), a personal digital assistant (PDA), a computer (e.g., tablet, desktop, palmtop, or laptop), a television, or a set-top box (STB). Each of wireless devices 120-1 through 120-n may include a wireless communication interface, such as, for example, a NFC communication interface, a BlueTooth communication interface, an infrared communication interface, a cellular network communication interface, a Wi-Fi (e.g., IEEE 802.11) communication interface, a ZigBee communication interface, etc.

Hub 100 may connect to wireless device 120-1 via wireless PAN 230. Wireless PAN 230 may include, for example, a wireless Universal Serial Bus (USB), Bluetooth, Z-Wave, ZigBee, Infrared Data Association (IrDA), or body area network. Hub 100 may connect to wireless device 120-2 via a direct wireless connection between hub 100 and device 120-2. The direct wireless connection may include, for example, a direct RF, or infrared, connection. Hub 100 may connect to wireless device 120-3 via wireless local area network (LAN) 240. Wireless LAN 240 may include, for example, a Wi-Fi network based on the IEEE 802.11 standard.

Hub 100 may connect to wireless device 120-n via cellular network 250. Cellular network 250 may include a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs).

Each of wireless connectivity-lacking devices 130-1 through 130-m may connect to hub 100 via wired connections. The wired connections may include any type of direct wired connection (e.g., HDMI, USB, RCE, etc.). Devices 130-1 through 130-m may lack any type of wireless communication capability such that they may only communicate via the direct wired connection with hub 100.

Network 205 may one or more networks including, for example, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). In some embodiments, cellular network 250 may be one of the networks included in network 205.

SVC provider server 210 may include a network device that connects to hub 100 via network 200, and may, in some implementations, store device connectivity profiles of wireless devices associated with one or more users (e.g., service provider customers). SVC provider server 210 may use the device connectivity profiles of the wireless devices associated with the respective user to automatically set-up and configure hub 100 to connect with each of wireless devices wireless devices 120-1 through 120-n.

Customer portal device 220 may connect to hub 100 via network 205, and may enable a customer associated with wireless devices 120-1 through 120-n (e.g., user 110 shown in FIG. 1A) to use a customer portal (e.g., accessible via a web browser loaded with a portal webpage) to set-up and configure hub 100 to connect with each of wireless devices 120-1 through 120-n.

The configuration of network components of network environment 200 illustrated in FIG. 2 is for illustrative purposes. Other configurations may be implemented. Therefore, network environment 200 may include additional, fewer and/or different components that may be configured in a different arrangement than those depicted in FIG. 2. For example, a single hub 100 and a single group of wireless devices 120-1 through 120-n are shown in FIG. 2 for purposes of illustration. Network 200 may include multiple hubs 100, with each hub 100 having its own group of wireless devices 120 (e.g., associated with a given user 110).

Figure 3:
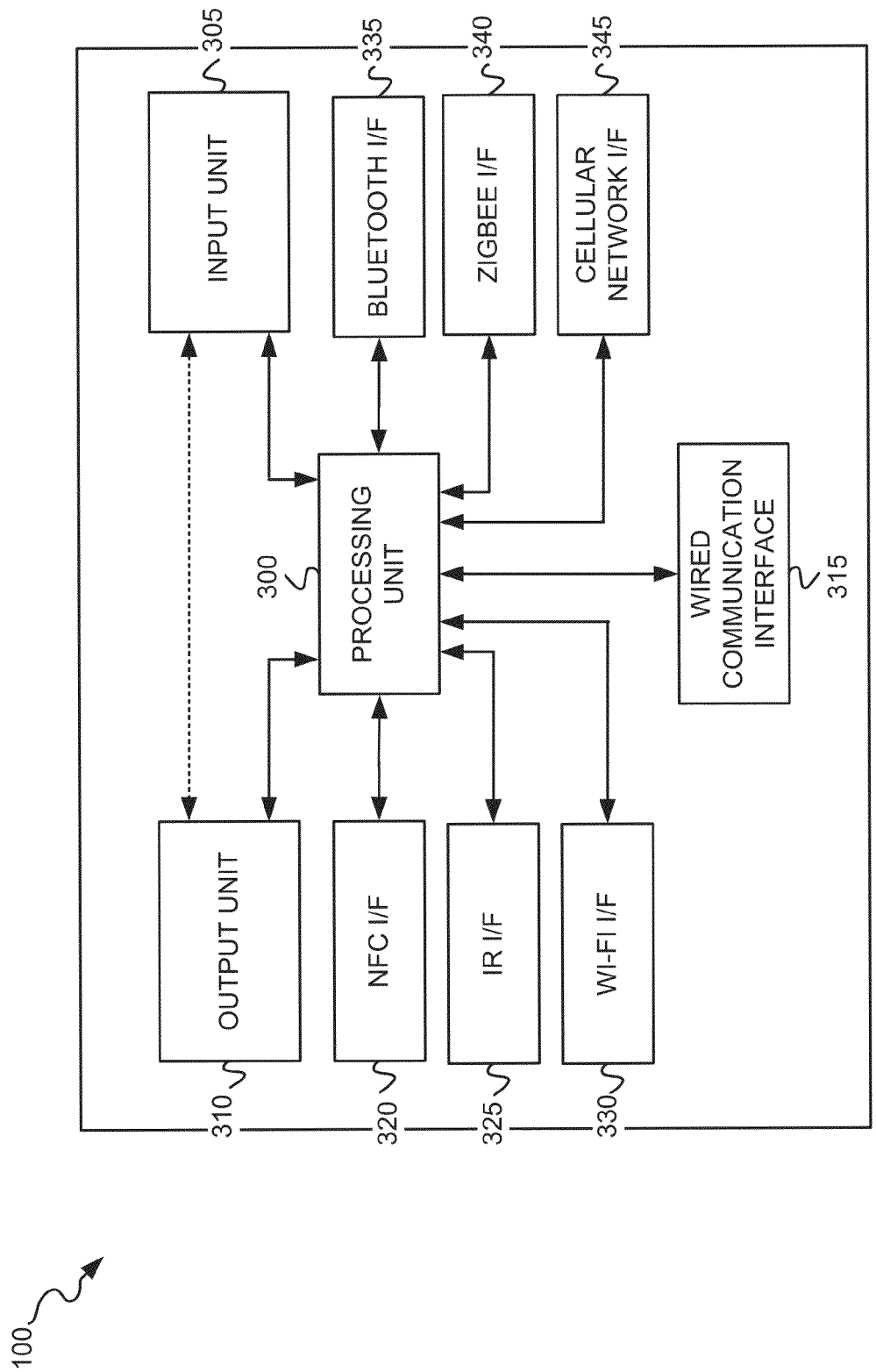
FIG. 3 is a diagram that depicts exemplary components of the multi-connectivity hub of FIGS. 1A, 1B and 2.

FIG. 3 is a diagram that depicts exemplary components of multi-connectivity hub 100. Hub 100 may include a processing unit 300, an input unit 305, an output unit 310, a wired communication interface 315, a NFC communication interface 320, an infrared (IR) communication interface 325, a Wi-Fi communication interface 330, a BlueTooth communication interface 335, a ZigBee communication interface 340, and a cellular network communication interface 345.

Processing unit 300 may include a processor, microprocessor, or processing logic that may interpret and execute instructions. The instructions may be stored in a memory (not shown), such as, for example, a random access memory (RAM), a Read Only Memory (ROM), or another type of dynamic or static storage device that may store information and instructions for execution by processing unit 300. The RAM, ROM, or other type of dynamic or static storage device may each be referred to herein as a "tangible, non-transitory computer-readable medium." The processes/methods described herein can be implemented as instructions that are stored in the RAM, ROM and/or other storage device for execution by processing unit 300.

Input unit 305 may include an alphanumeric keypad, and/or a touch screen display and mechanisms for receiving indications of touch input from the touch screen display. The touch screen display may register touch input at different locations upon the touch screen. Output unit 310 may include a display device that may display text, graphics, images, video data, or other types of data associated with the operation of hub 100. In some implementations, output unit 310 and input unit 305 may be implemented together as the touch screen display, in which the display device displays the text, graphics, images and/or video data, and the touch screen registers touch input upon the touch screen. Wired communication interface 315 may include a port(s) (e.g., a USB port(s)) that connect(s) with a wired connection to, for example, wireless connectivity lacking device(s) 130. Hub 100 may communicate with wireless connectivity lacking device(s) 130 via wired communication interface 315.

NFC communication interface 320 may include a short range, high frequency system that enables the exchange of data with devices 120 that have NFC communication capability. IR communication interface 325 may include an infrared transceiver that enables the exchange of data with devices 120 that have infrared communication capability. Wi-Fi communication interface 330 may include a transceiver that enables communication with devices 120 that have Wi-Fi communication capability. Bluetooth communication interface 335 may include a short wavelength system for connecting with, and exchanging data over short distances, with wireless devices 120 that are Bluetooth-enabled. ZigBee communication interface 340 may include a system that enables the exchange of data with devices 120 that have ZigBee communication capability. Cellular network communication interface 345 may include a cellular transceiver that enables the exchange of data, via cellular network 250, between hub 100 and devices 120 that have cellular network communication capability.

The configuration of components of hub 100 illustrated in FIG. 3 is for illustrative purposes only. Other configurations may be implemented. Therefore, hub 100 may include additional, fewer and/or different components than those depicted in FIG. 3. For example, hub 100 may include additional and/or different types of communication interfaces that enable hub 100 to connect to wireless devices 120 via different types of wireless standards than the wireless standards available to communication interfaces 320-345 (e.g., UWB, WiMAX).

Figure 4:
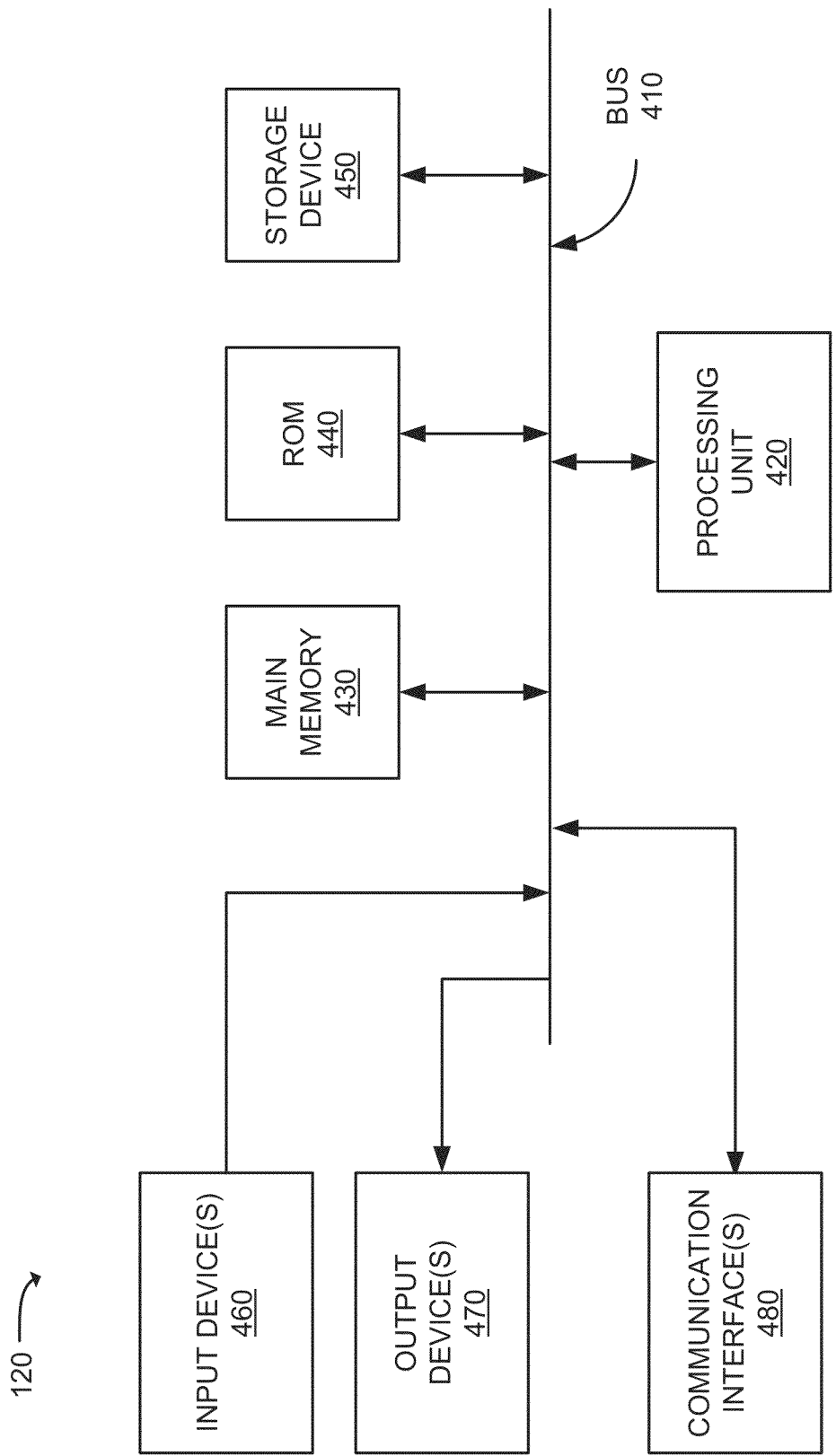
FIG. 4 is a diagram that depicts exemplary components of a wireless device of FIGS. 1A, 1B and 2.

FIG. 4 is a diagram that depicts exemplary components of a wireless device 120. Devices 130, SVC provider server 210, and customer portal device 220 may each be configured identical to, or similar to, wireless device 120. Wireless device 120 may include a bus 410, a processing unit 420, a main memory 430, a read only memory (ROM) 440, a storage device 450, an input device 460, an output device 470, and a communication interface 480. Bus 410 may include a path that permits communication among the components of device 400.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium.

Input device 460 may include one or more mechanisms that permit an operator to input information to device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Input device 460 and output device 470 may, in some implementations, be implemented as a user interface (UI) that displays UI information and which receives user input via the UI. Communication interface(s) 480 may include circuitry that enables wireless device 120 to communicate with networks, or other devices or systems, such as, for example, with hub 100. Communication interface(s) 480 may include, for example, a NFC communication interface, a BlueTooth communication interface, an IR communication interface, a Wi-Fi communication interface, a Zigbee communication interface, or a cellular network communication interface.

The configuration of components of wireless device 120 illustrated in FIG. 4 is for illustrative purposes. Other configurations may be implemented. Therefore, wireless device 120 may include additional, fewer and/or different components than those depicted in FIG. 4.

Figure 5:
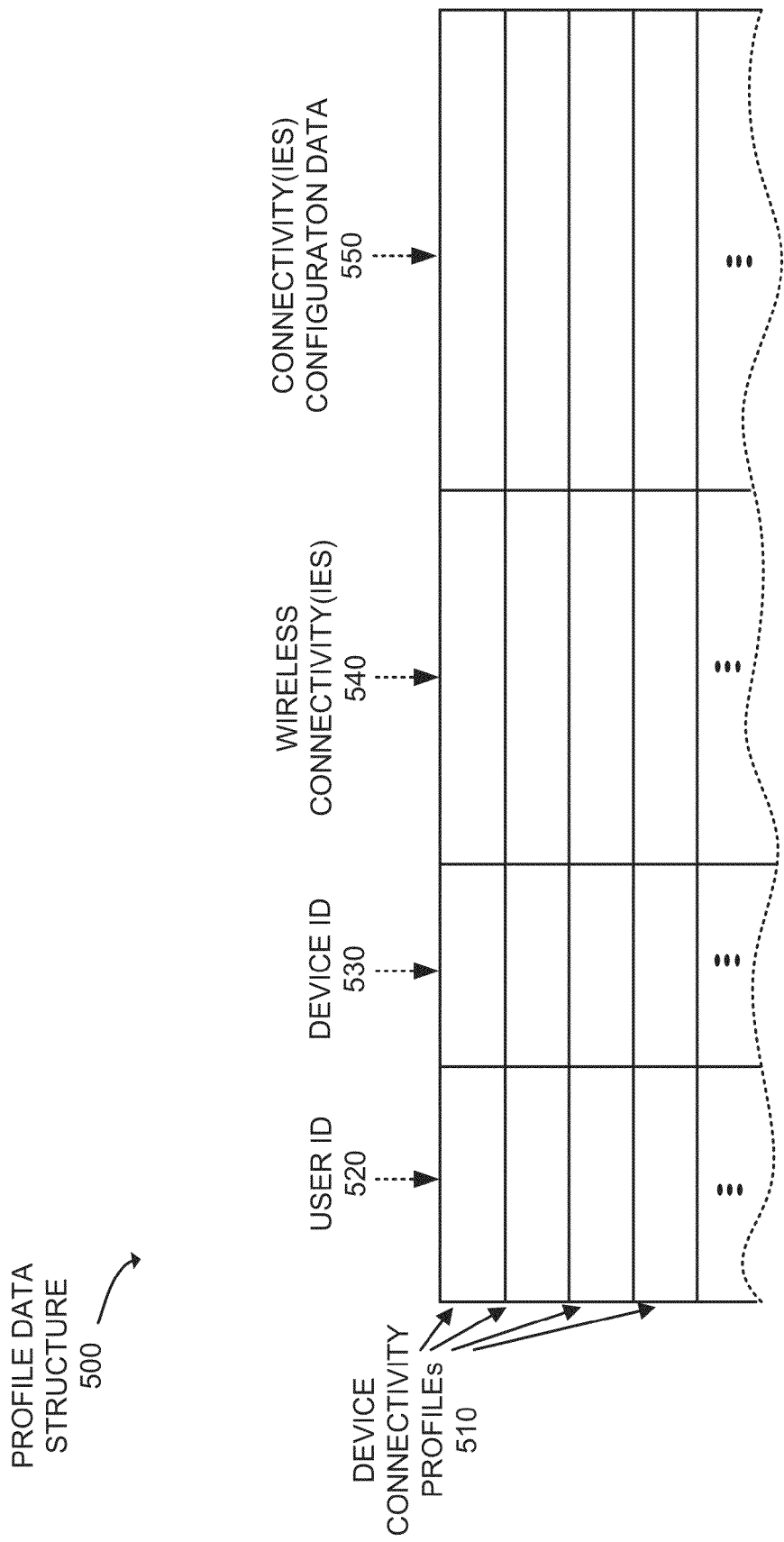
FIG. 5 depicts a profile data structure that may store multiple device connectivity profiles associated with multiple different wireless devices of FIGS. 1A, 1B and 2.

FIG. 5 depicts a profile data structure 500 that may store multiple device connectivity profiles 510 associated with multiple different wireless devices 120. Profile data structure 500 may be stored in memory for data retrieval at hub 100, SVC provider server 210, and/or customer portal device 220. As shown in FIG. 5, profile data structure 500 may store multiple device connectivity profiles 510, each of which includes a user identifier (ID) field 520, a device ID field 530, a wireless connectivity(ies) field 540, and a connectivity(ies) configuration data field 550.

User ID field 520 may store identifier data that uniquely identifies a specific user that is associated with the wireless device identified in device ID field 530. The user may, for example, be a customer of a network service provider that provides hub 100 as part of one of the services to which the user can subscribe.

Device ID field 530 may store an identifier that uniquely identifies a wireless device. Wireless connectivity(ies) field 540 may store data that identifies one or more types of wireless connectivities that is currently available for communication at the wireless device identified by device ID field 530. Connectivity(ies) configuration data field 550 may store data that includes all necessary parameters for setting up, configuring, and establishing a connection between hub 100 and the wireless device identified by device ID field 530. Hub 100 may retrieve the data stored in connectivity(ies) configuration data field 550 when configuring a wireless connection via the wireless connectivity identified in field 540 with the wireless device identified by device ID field 530.

The number and content of the fields of each device connectivity profile 510 of profile data structure 500 depicted in FIG. 5 is for illustrative purposes. Each device connectivity profile 510 may include additional, fewer and/or different fields than those depicted in FIG. 5. For example, each device connectivity profile 510 may further include a field for identifying a hub 100 that is associated with the user identified by user ID field 520 (i.e., the hub 100 used by that user). Profile data structure 500 is depicted in FIG. 5 as a tabulated data structure for purposes of illustration. Other types of data structures, not shown, may also be used for associating data fields 520-540 within a device connectivity profile 510.

Figure 6:
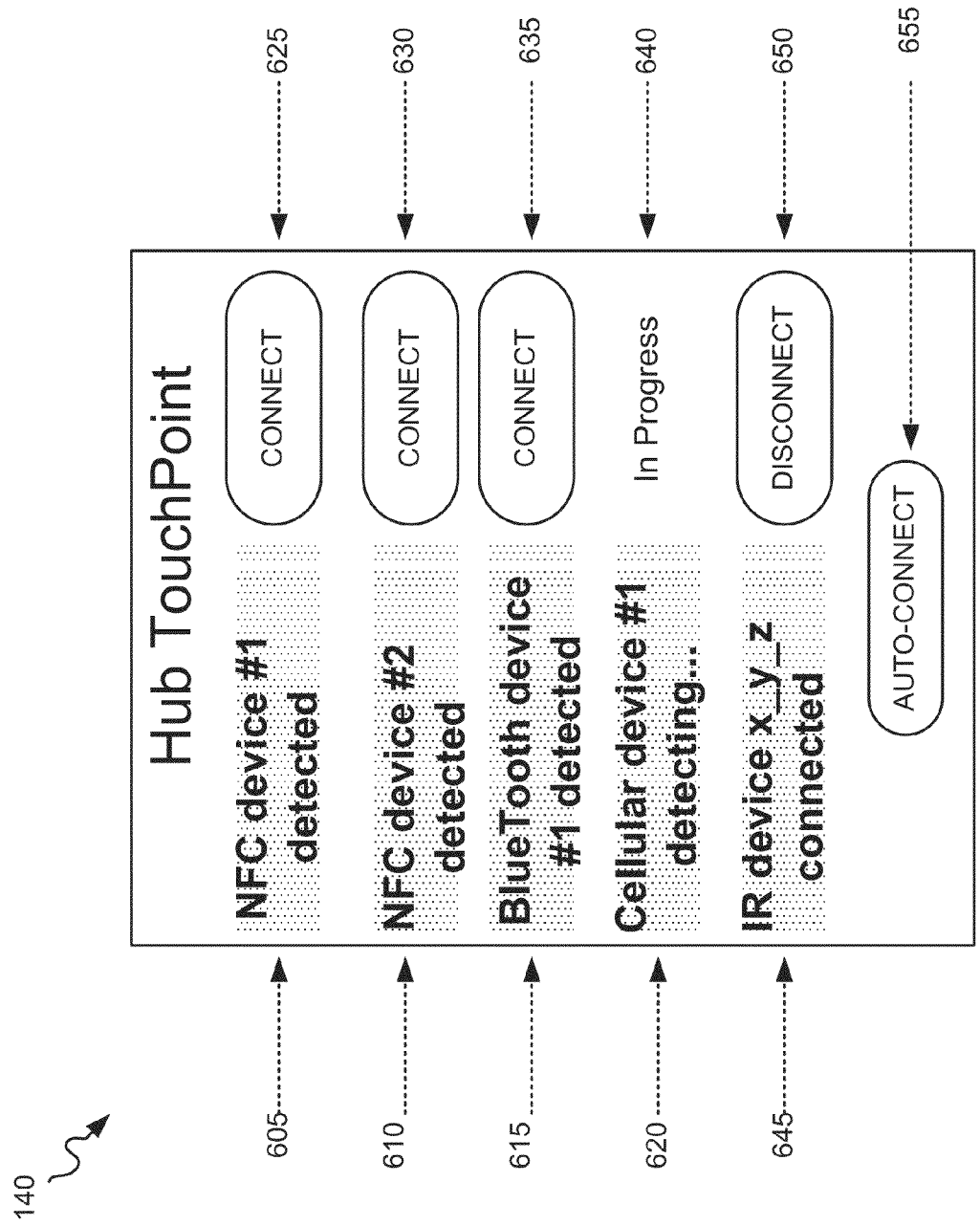
FIG. 6 depicts an example of the use of a touchscreen display of an input unit of the multi-connectivity hub of FIGS. 1A, 1B and 2 for connecting the hub to multiple wireless devices 120 via multiple different wireless connectivities.

FIG. 6 depicts an example of the use of user interface tool 140 of multi-connectivity hub 100 for connecting hub 100 to multiple wireless devices 120 via multiple different wireless connectivities, in which user interface tool 140 is displayed by a touch screen display. In the example of FIG. 6, upon power up of hub 100 or upon user activation, hub 100 may automatically use communication interfaces 320-345 to detect the presence of wireless devices 120. As shown in FIG. 6, user interface tool 140 of hub 100 may provide a first indication 605 that a first wireless device 120 having NFC capability has been detected, and a second indication 610 that a second wireless device 120 having NFC capability has been detected. In an exemplary implementation, user interface tool 140 allows the user to save names for wireless devices 120.

User interface tool 140 of hub 100 may further provide an indication 615 that a wireless device 120 having BlueTooth capability has been detected. User interface tool 140 of hub 100 may also provide an indication 620 that hub 100 is still in the process (e.g., "In progress" 640) of detecting a wireless device having cellular network communication capability.

Upon detection of a wireless device 120 by hub 100, user interface tool 140 may provide a user interface in a region of the touch screen display that, when touched by the user, initiates the configuration of, and establishment of, a connection between hub 100 and the wireless device 120 via a detected type of wireless connectivity. For example, as shown in FIG. 6, manual "connect" buttons 625, 630 and 635 may be displayed by display 600 in association with respective indicators 605, 610 and 615 (e.g., detected wireless devices 120). Upon a user touch being applied to any of buttons 625, 630 and 635, than hub 100 may connect to a respective wireless device 120 via the indicated type of connectivity. FIG. 6 further depicts the display of an indicator 645 that indicates a device having IR connectivity has connected to hub 100. User interface tool 140 may, in conjunction with a connection indicator (e.g., indicator 645), may display a "disconnect" button (e.g., button 650) that permits the user to manually disconnect from a given device having a certain type of connectivity. User interface tool 140 of hub 100 may additionally include an "auto-connect" button 655 that, when selected by a user, causes hub 100 to automatically connect to wireless devices 120 whose presence and wireless connectivities have been detected (i.e., avoiding having to manually select "connect" buttons 625, 630 or 635).

Figure 7:
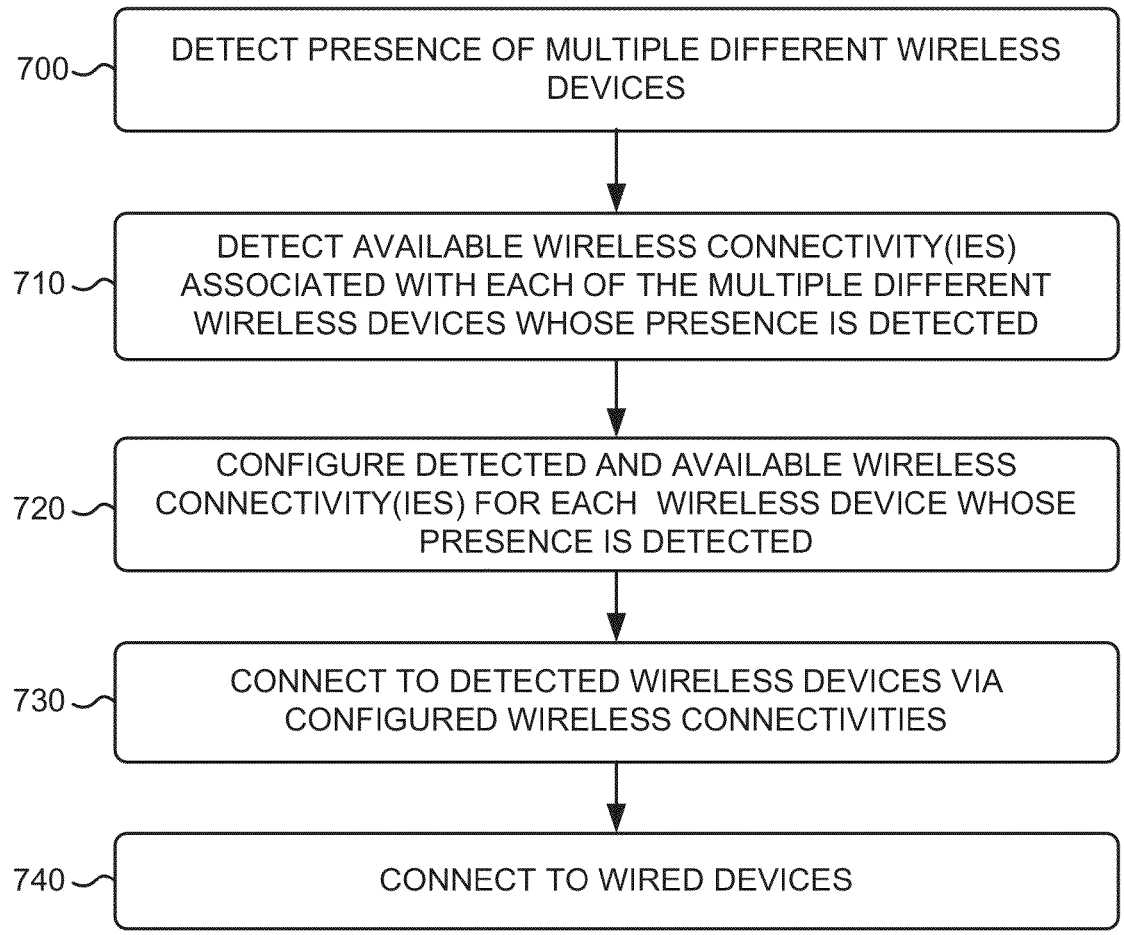
FIG. 7 is a flow diagram of an exemplary process for detecting the presence of multiple different wireless devices, and their associated wireless connectivities, and connecting to the wireless devices whose presence has been detected.

FIG. 7 is a flow diagram of an exemplary process for detecting the presence of multiple different wireless devices and their associated wireless connectivities, and for connecting hub 100 to the wireless devices whose presence has been detected. The exemplary process of FIG. 7 may be implemented by hub 100. The exemplary process of FIG. 7 is described below with reference to the diagrams of FIGS. 8-11.

Figure 11:
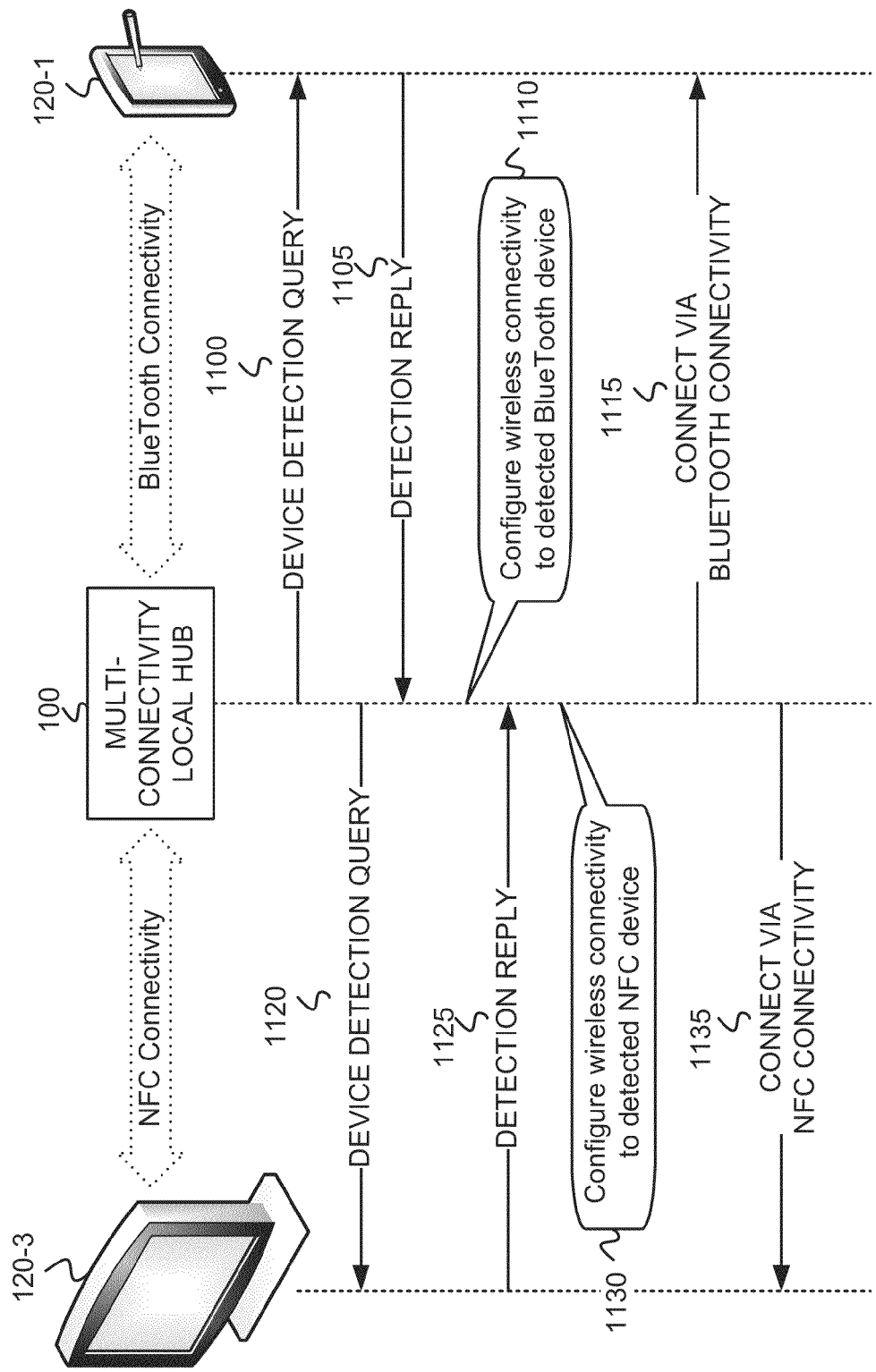
FIG. 11 is a messaging diagram that depicts an example of an implementation of the exemplary process of FIG. 7.

The exemplary process may include hub 100 detecting the presence of multiple different wireless devices (block 700). Hub 100 may send out (e.g., broadcast) one or more device detection queries via communication interfaces 320-345 to attempt to detect the presence of wireless devices. The content of the device detection query may be based on the particular wireless connectivity being used by the particular one of communication interfaces 320-345 of hub 100. FIG. 11 depicts an example of hub 100 sending a device detection query message 1100 via BlueTooth connectivity, and a device detection query 1120 via NFC connectivity.

Figure 8:
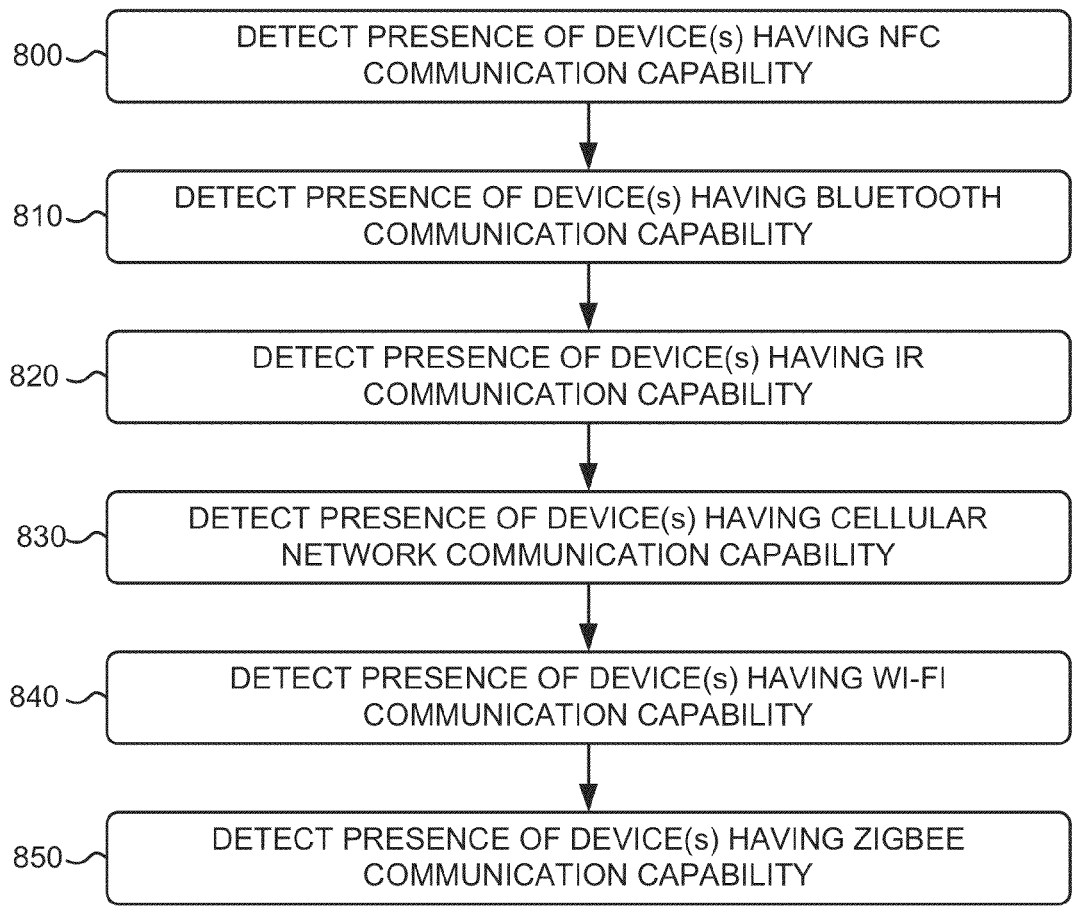
FIG. 8 is a flow diagram that depicts exemplary device detections that may occur to implement block 700 of FIG. 7.

FIG. 8 depicts exemplary device detection operations that hub 100 may perform when implementing block 700 of FIG. 7 using communication interfaces 320-340. Hub 100 may detect the presence of a device(s) having NFC communication capability (block 800) and a device(s) having BlueTooth communication capability (block 810). Hub 100 may detect the presence of a device(s) having IR communication capability (block 820) and a device(s) having cellular network communication capability (block 830). Hub 100 may detect the presence of a device(s) having Wi-Fi communication capability (block 840) and a device(s) having ZigBee communication capability (block 850). In each of blocks 800-850, hub 100 may send a device detection query via an appropriate one of communication interfaces 320-345 (or other type of communication interface implemented in hub 100) and, upon receipt of an appropriate reply from a device, may determine that a device's presence has been detected. In the example of FIG. 11, hub 100 receives a detection reply message 1105, via BlueTooth connectivity, from tablet computer 120-1 in response to device detection query message 1100. Hub 100 further receives a detection reply message 1125, via NFC connectivity, from TV 120-3 in response to device detection query message 1120.

Returning to FIG. 7, hub 100 may detect available wireless connectivity(ies) associated with each of the multiple different wireless devices whose presence is detected (block 710). Each wireless device 120 may have one or more wireless connectivities that may be available for use by hub 100 for establishing a connection with each wireless device 120. If a wireless device 120 has only a single type of wireless connectivity, and it is currently in use, than the wireless connectivity of that device would be unavailable to hub 100. If wireless device 120 has multiple wireless connectivities, and at least one of the connectivities is unused (or not fully subscribed), then hub 100 may detect the availability of the at least one connectivity. In an exemplary implementation, if wireless device 120 has multiple available wireless connectivities, hub 100 may select an optimal wireless connectivity based on one or more metrics (e.g., power, available bandwidth, etc.). In some implementations, hub 100 may access profile data structure 500 to retrieve a device connectivity profile 510 for each device whose presence is detected. Wireless connectivity(ies) field 540 of the retrieved device connectivity profile 510 may store data that identifies one or more types of wireless connectivities that are currently available for communication.

Figure 9:
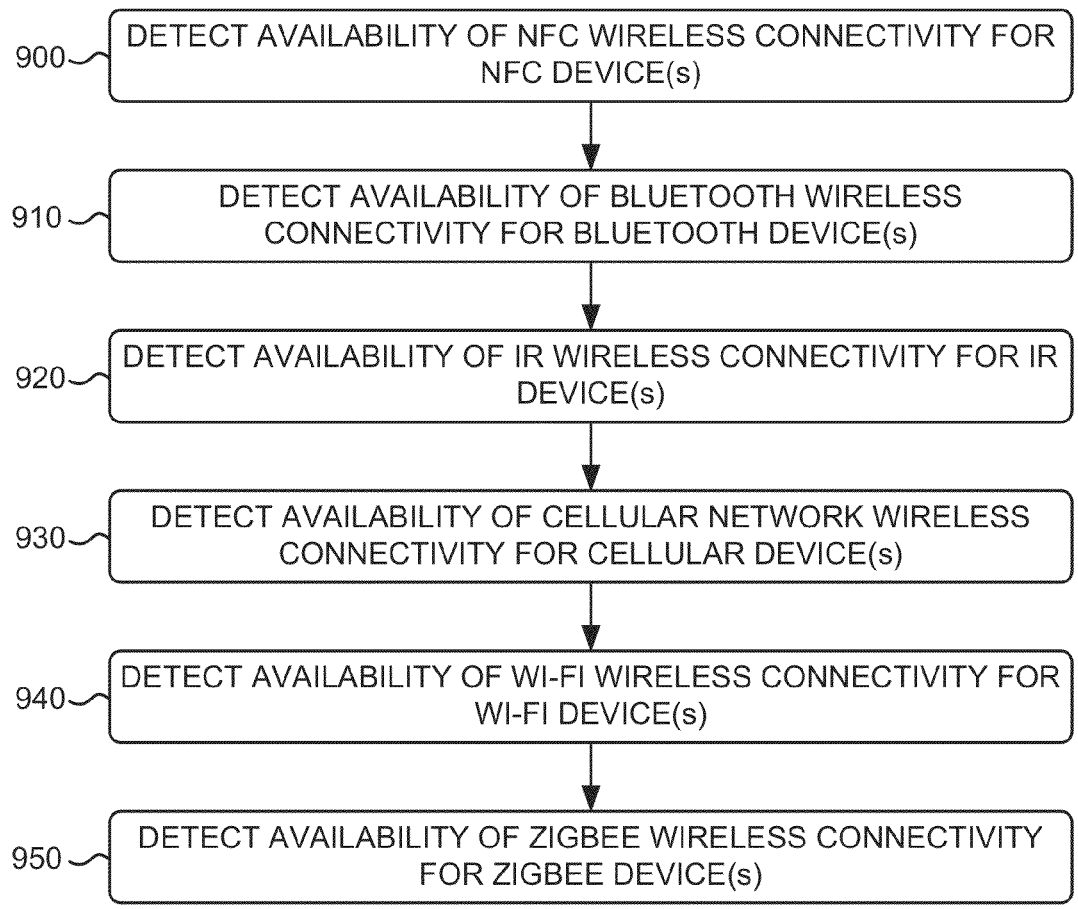
FIG. 9 is a flow diagram that depicts exemplary wireless connectivity detections that may occur to implement block 710 of FIG. 7.

FIG. 9 depicts exemplary wireless connectivity detection operations that hub 100 may perform to implement block 710 of FIG. 7. Hub 100 may detect the availability of NFC wireless connectivity for a device(s) having NFC communication capability (block 900) and the availability of BlueTooth wireless connectivity for a device(s) having BlueTooth communication capability (block 910). Hub 100 may detect the availability of IR wireless connectivity for a device(s) having IR communication capability (block 920) and the availability of cellular network wireless connectivity for a device(s) having cellular network communication capability (block 930). Hub 100 may detect the availability of Wi-Fi connectivity for a device(s) having Wi-Fi communication capability (block 940) and the availability of ZigBee wireless connectivity for a device(s) having ZigBee communication capability (block 950).

Returning to FIG. 7, hub 100 may configure the detected and available wireless connectivity(ies) for each wireless device whose presence is detected (block 720). Hub 100 may access profile data structure 500 to retrieve a device connectivity profile 510 for the detected wireless device. Hub 100 may use the data from connectivity(ies) configuration data field 550 of the retrieved device connectivity profile 510 to configure the detected wireless connectivity for a given wireless device 120. The data may identify various parameters necessary for communicating between hub 100 and a given wireless device 120 via the detected and available connectivity, such as, for example, a channel to be used, encryption to be used, authentication parameters, and/or other types of parameters that are particular for the type of wireless connectivity being used.

In one embodiment, referring to FIGS. 2 and 5, SVC provider server 210 may access profile data structure 500 to remotely and automatically manage the configuration of hub 100. Server 210 may populate fields 520-550 of each device connectivity profile 510 and may, without user intervention, use the values in the fields of each profile 510 to automatically configure the wireless connectivity from hub 100 to each wireless device identified by device ID field 530 such that hub 100 can connect to the wireless device 120 via an available wireless connectivity.

In another embodiment, user 110 may use customer portal device 220 to manage the configuration of hub 100. Customer portal device 220 may access profile data structure 500 to enable user 110 to configure wireless connectivities between hub 100 and detected wireless devices 120.

Figure 10:
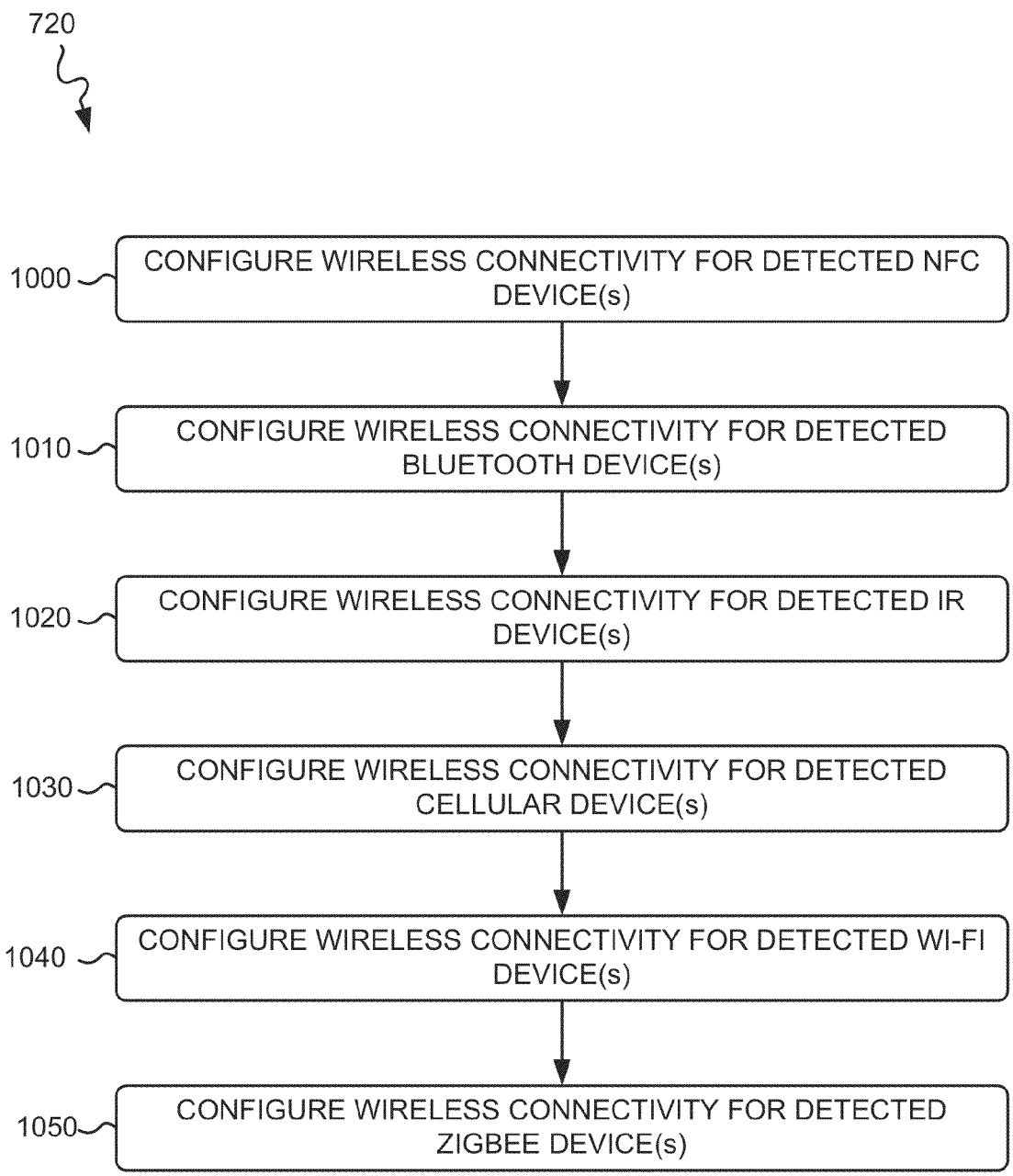
FIG. 10 is a flow diagram that depicts exemplary wireless connectivity configurations that may occur to implement block 720 of FIG. 7.

FIG. 10 is a flow diagram that depicts exemplary wireless connectivity configurations that may occur to implement block 720 of FIG. 7. Hub 100 may configure the wireless connectivity for the detected NFC device(s) (block 1000) and for the detected BlueTooth device(s) (block 1010). Hub 100 may configure the wireless connectivity for the detected IR device(s) (block 1020) and for the detected cellular network device(s) (block 1030). Hub 100 may configure the wireless connectivity for the detected Wi-Fi device(s) (block 1040) and for the detected ZigBee device(s) (block 1050). FIG. 11 depicts hub 100 configuring 1110 the BlueTooth wireless connectivity to detected BlueTooth wireless device 120-1, and configuring 1130 the NFC wireless connectivity to detected NFC wireless device 120-3.

Returning to FIG. 7, hub 100 may connect to the detected wireless devices via the configured wireless connectivities (block 730) and to wired devices lacking wireless connectivity (block 740). The example of FIG. 11 depicts hub 100 connecting 1115 to wireless device 120-1 via BlueTooth connectivity and to wireless device 120-3 via NFC connectivity. As shown in FIG. 1A, wireless connectivity-lacking device(s) 130 may connect to hub 100 via a wired connection (e.g., via wired communication interface 315 of hub 100).

Figure 12:
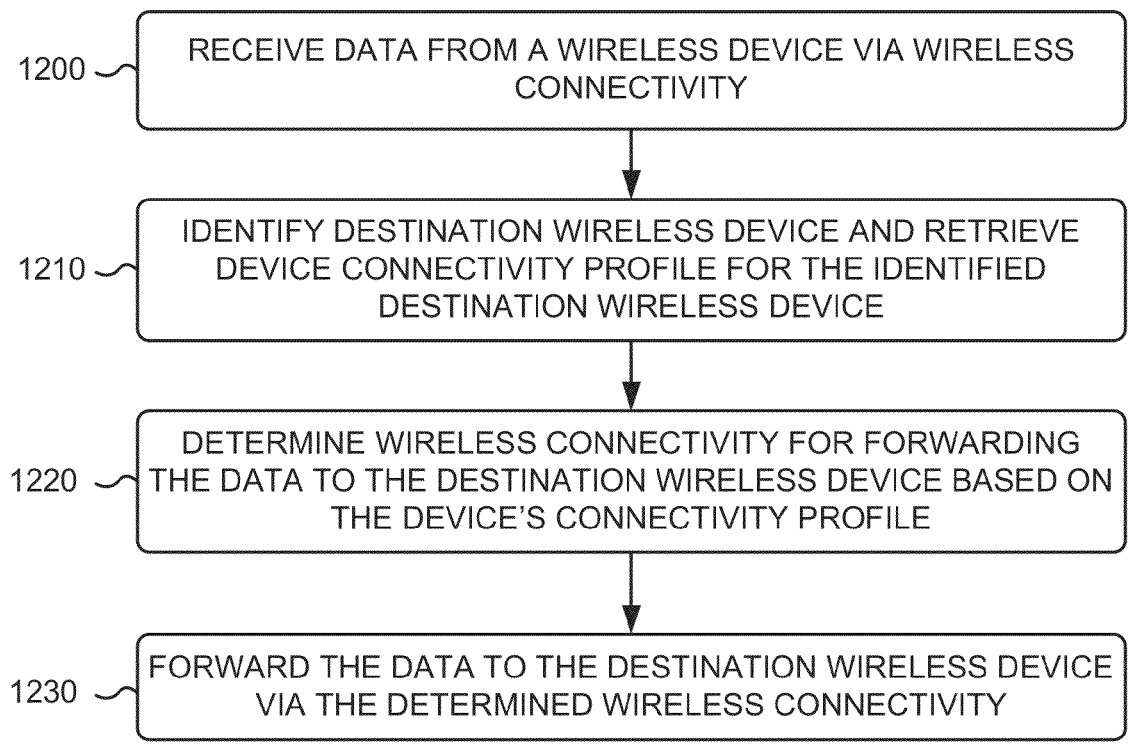
FIG. 12 is a flow diagram of an exemplary process for relaying data, by the hub of FIGS. 1A, 1B and 2, from a first wireless device connected to the hub via a first wireless connectivity to a second wireless device connected to the hub via a second wireless connectivity.

FIG. 12 is a flow diagram of an exemplary process for relaying data, by hub 100, from a first wireless device connected to hub 100 via a first wireless connectivity to a second wireless device connected to hub 100 via a second wireless connectivity. The exemplary process of FIG. 12 may be implemented by hub 100 subsequent to establishing a connection with wireless device(s) 120 via the exemplary process of FIG. 7. The exemplary process of FIG. 12 is described below with reference to the diagram of FIG. 13.

Figure 13:
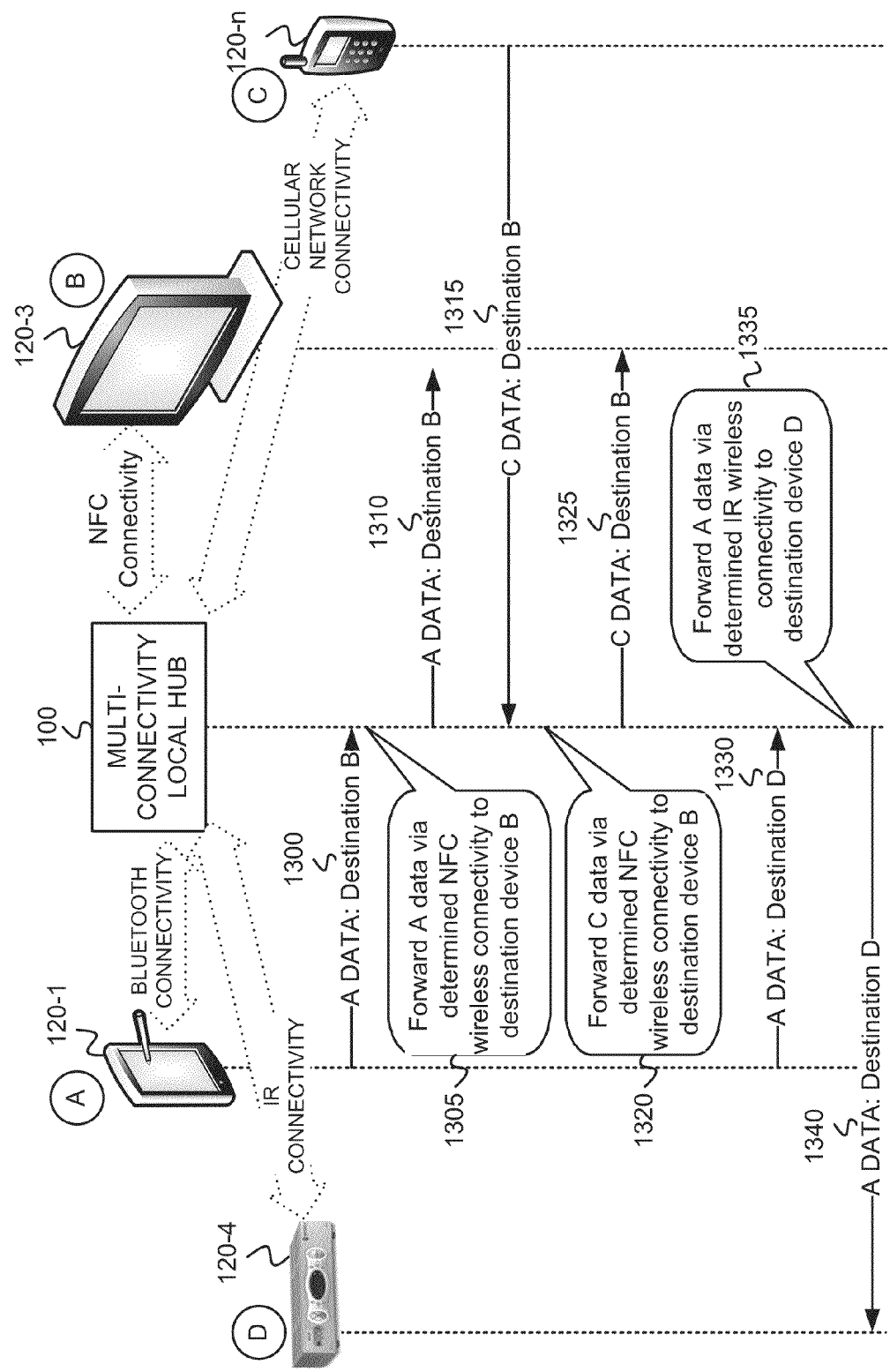
FIG. 13 is a messaging diagram that depicts an example of an implementation of the exemplary process of FIG. 12.

The exemplary process may include hub 100 receiving data from a wireless device 120 via wireless connectivity (block 1200). Wireless device 120 may be aware of the presence of one or more other wireless devices 120, and may send data to hub 100 with an explicity destination specified within the data such that hub 100 may identify the destination wireless device 120 for the data. FIG. 13 depicts one example of data forwarding via hub 100. As shown in FIG. 13, hub 100 may receive data 1300 sent from wireless device 120-1 (identified with an "A" within a circle) via BlueTooth connectivity, where data 1300 is destined for wireless device 120-3 (identified with a "B" within a circle). As further shown in FIG. 13, hub 100 may receive data 1315 from wireless device 120-n (identified with a "C" within a circle) via cellular network connectivity, where data 1315 is destined for wireless device B. As also shown in FIG. 13, hub 100 may receive data 1330 from wireless device A via BlueTooth connectivity, where data 1330 is destined for wireless device 120-4 (identified with a "D" within a circle).

Hub 100 may identify the destination wireless device for the received data and retrieve a device connectivity profile for the identified destination wireless device (block 1210). Hub 100 may identify the destination wireless device based, for example, on an explicit indication within the data received from the originating wireless device 120. As shown in the example of FIG. 13, data 1300 received at hub 100 includes data that identifies it as being destined for wireless device B, data 1315 received at hub 100 includes data that identifies it as being destined for wireless device B, and data 1330 received at hub 100 includes data that identifies it as being destined for wireless device D. Upon receipt of each message containing data, hub 100 may index profile data structure 500 to match the identified destination wireless device with a value in device ID field 530. Upon finding a match in device ID field 530 of profile data structure 500, hub 100 may retrieve the corresponding data from wireless connectivity(ies) field 540 and connectivity(ies) configuration data field 550.

Hub 100 may determine an available wireless connectivity for forwarding the data to the destination wireless device based on the device's connectivity profile (block 1220). Hub 100 may, based on the data from wireless connectivity(ies) field 540 of the retrieved device connectivity profile 510 (from block 1210) identify wireless connectivity that is available for use by the destination wireless device. For example, wireless connectivity(ies) field 540 of the retrieved device connectivity profile 510 may identify NFC connectivity as being the available wireless connectivity for the destination wireless device.

Hub 100 may forward the data to the destination wireless device via the determined wireless connectivity (block 1230). The example of FIG. 13 depicts hub 100 forwarding 1305 data 1310 from wireless device A to destination wireless device B via a determined NFC connectivity available at wireless device B. FIG. 13 further depicts hub 100 forwarding 1320 data 1325 from wireless device C to destination wireless device B via a determined NFC connectivity available at wireless device B. FIG. 13 additionally depicts hub 100 forwarding 1335 data 1340 from wireless device A to destination wireless device D via a determined IR connectivity available at wireless device D.

The exemplary process of FIG. 12 may be repeated for each block of data received at hub 100 from a wireless device 120. The block of data may include any type of data whose contents and format may, for example, be dictated by the underlying wireless connectivity (e.g., BlueTooth protocols, cellular network protocols) used to received and/or forward the data from hub 100 to its intended destination wireless device.

A multi-connectivity hub, as described herein, enables "any-to-any" wireless data relaying in which the hub forwards data from a wireless device having one type of wireless connectivity to another device having a second type of wireless connectivity. Using multiple different types of wireless connectivity, such as, for example, NFC, infrared, ZigBee, BlueTooth, cellular network, UWB, WiMAX, and/or Wi-Fi connectivity, the hub described herein may automatically detect the presence of external wireless devices that use any of the multiple different types of wireless connectivity, and may then configure and establish a connection to the detected wireless devices. The hub may then forward data to and from each of the wireless devices via the multiple different types of wireless connectivity.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7-10 and 12, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
using, at a hub device, one or more of a plurality of different wireless communication interfaces to detect a presence of a plurality of different wireless devices, wherein, each of the plurality of different wireless devices is initially unknown to the hub device and implements a type of wireless connectivity that is further initially unknown to the hub device;
accessing a data structure, stored at a location remote from the hub device, to retrieve device connectivity profiles associated with the detected plurality of different wireless devices, wherein each of the retrieved device connectivity profiles identifies one or more types of wireless connectivity that are currently available for communication with a respective one of the detected plurality of different wireless devices;
configuring, at the hub device based on each of the retrieved device connectivity profiles, one of the one or more types of wireless connectivity available for communication with a respective one of the detected plurality of different wireless devices; and
connecting, at the hub device, to the plurality of different wireless devices, using the one of the one or more types of wireless connectivity available for communication with each of the detected plurality of different wireless devices.

2. The method of claim 1, wherein the plurality of different wireless communication interfaces comprises:
at least one of a Near Field Communication (NFC) communication interface, an infrared communication interface, or a ZigBee communication interface; and
one or more of a BlueTooth communication interface, a cellular network communication interface, or a Wi-Fi communication interface.

3. The method of claim 1, wherein the one or more of the plurality of different wireless communication interfaces comprises at least two different wireless communication interfaces and wherein the at least two different wireless communication interfaces comprises at least two different wireless communication interfaces from the following:
a Near Field Communication (NFC) communication interface, an infrared communication interface, a ZigBee communication interface, a BlueTooth communication interface, a cellular network communication interface, or a Wi-Fi communication interface.

4. The method of claim 1, wherein the detected plurality of different wireless devices comprises a first wireless device that uses a first type of wireless connectivity and a second wireless device that uses a second type of wireless connectivity, wherein the second type of wireless connectivity is different than the first type of wireless connectivity.

5. The method of claim 4, wherein first type of wireless connectivity and the second type of wireless connectivity each comprises a different one of: a Near Field Communication (NFC) connectivity, an infrared connectivity, a ZigBee connectivity, a BlueTooth connectivity, a cellular network connectivity, or a Wi-Fi connectivity.

6. The method of claim 4, wherein the detected plurality of different wireless devices comprises a third wireless device that uses a third type of wireless connectivity, wherein the third type of wireless connectivity is different than the first and second types of wireless connectivity.

7. The method of claim 6, wherein first type of wireless connectivity, the second type of wireless connectivity, and the third type of wireless connectivity each comprises a different one of: a Near Field Communication (NFC) connectivity, an infrared connectivity, a ZigBee connectivity, a BlueTooth connectivity, a cellular network connectivity, or a Wi-Fi connectivity.

8. The method of claim 1, wherein each of the device connectivity profiles, associated with respective ones of the detected plurality of different wireless devices, are manually configured, prior to retrieval, by a customer via a customer portal device that is remote from the hub device.

9. The method of claim 1, wherein each of the device connectivity profiles, associated with respective ones of the detected plurality of different wireless devices, are automatically configured, prior to retrieval, by a network service provider server that is remote from the hub device.

10. The method of claim 1, further comprising:
determining a device identifier associated with each of the detected plurality of different wireless devices,
wherein accessing the data structure to retrieve device connectivity profiles further comprises:
indexing the data structure with the device identifier to retrieve a respective one of the device connectivity profiles associated with each of the detected plurality of different wireless devices.

11. The method of claim 1, wherein each of the retrieved device connectivity profiles specifies parameters associated with communicating between the hub device and a respective one of the detected plurality of different wireless devices, wherein the parameters include one or more of a channel to be used, encryption to be used, or authentication parameters to be used for communicating between the hub device and the respective one of the detected plurality of different wireless devices.

12. A hub device, comprising:
a plurality of different wireless communication interfaces;
a processing unit configured to:
detect, using one or more of the plurality of different wireless communication interfaces, the presence of a plurality of different wireless devices, wherein, initially, each of the plurality of different wireless devices implements a type of wireless connectivity that is unknown to the hub device,
access a data structure, stored at a location remote from the hub device, to retrieve device connectivity profiles associated with the detected plurality of different wireless devices, wherein each of the retrieved device connectivity profiles identifies one or more types of wireless connectivity that are currently available for communication with a respective one of the detected plurality of different wireless devices;
configure, based on each of the retrieved device connectivity profiles, one of the one or more types of wireless connectivity available for communication with a respective one of the detected plurality of different wireless devices; and
cause a connection to be established to the plurality of different wireless devices, via the one of the one or more types of wireless connectivity available for communication with each of the detected plurality of different wireless devices.

13. The hub device of claim 12, wherein the plurality of different wireless communication interfaces comprises:
at least one of a Near Field Communication (NFC) communication interface, an infrared communication interface, or a ZigBee communication interface, and
one or more of a BlueTooth communication interface, a cellular network communication interface, or a Wi-Fi communication interface.

14. A method, comprising:
receiving, at a hub device, data from a first wireless device of a plurality of wireless devices, via a first type of wireless connectivity;
identifying a destination wireless device for the received data, wherein the destination wireless device comprises a second wireless device of the plurality of wireless devices;
accessing a data structure, stored at a location remote from the hub device, to retrieve a device connectivity profile associated with the destination wireless device, wherein the retrieved device connectivity profile identifies one or more types of wireless connectivity that are currently available for communication between the hub device and the destination wireless device;
determining an available wireless connectivity, from the identified one or more types of wireless connectivity, for communication between the hub device and the destination wireless device, wherein the available wireless connectivity comprises a second type of wireless connectivity that is different than the first type of wireless connectivity; and
forwarding the received data from the hub device to the destination wireless device via the determined available wireless connectivity.

15. The method of claim 14, wherein identifying the destination wireless device further comprises determining a device identifier associated with the destination wireless device; and
wherein accessing the data structure to retrieve the device connectivity profile further comprises indexing the data structure with the device identifier to retrieve the device connectivity profile associated with the destination wireless device.

16. The method of claim 14, wherein the first type of wireless connectivity and the second type of wireless connectivity each comprises a different one of: a Near Field Communication (NFC) connectivity, an infrared connectivity, a ZigBee connectivity, a BlueTooth connectivity, a cellular network connectivity, or a Wi-Fi connectivity.

17. The method of claim 14, wherein the device connectivity profile associated with the destination wireless device is manually configured, prior to retrieval, by a customer via a customer portal device that is remote from the hub device.

18. The method of claim 14, wherein the device connectivity profile associated with the destination wireless device is automatically configured, prior to retrieval, by a network service provider server that is remote from the hub device.

19. A hub device, comprising:
a plurality of different types of wireless communication interfaces;

a processing unit configured to:
- receive data, via a first type of wireless communication interface of the plurality of different types of wireless communication interfaces, from a first wireless device of a plurality of wireless devices, via a first type of wireless connectivity,
- identify a destination wireless device for the received data, wherein the destination wireless device comprises a second wireless device of the plurality of wireless devices,
- access a data structure, stored at a location remote from the hub device, to retrieve a device connectivity profile associated with the destination wireless device, wherein the retrieved device connectivity profile identifies one or more types of wireless connectivity that are currently available for communication between the hub device and the destination wireless device,
- determine an available wireless connectivity, from the identified one or more types of wireless connectivity, for communication between the hub device and the destination wireless device, wherein the available wireless connectivity comprises a second type of wireless connectivity that is different than the first type of wireless connectivity, and,
- forward the received data from the hub device to the destination wireless device, via a second type of wireless communication interface of the plurality of different types of wireless communication interfaces, via the determined available wireless connectivity.

20. The hub device of claim 19, wherein the plurality of different types of wireless communication interfaces comprises at least two different ones of: a Near Field Communication (NFC) communication interface, an infrared communication interface, a ZigBee communication interface, a BlueTooth communication interface, a cellular network communication interface, or a Wi-Fi communication interface.

21. The hub device of claim 19, wherein the first type of wireless connectivity and the second type of wireless connectivity each comprises a different one of: a Near Field Communication (NFC) connectivity, an infrared connectivity, a ZigBee connectivity, a BlueTooth connectivity, a cellular network connectivity, or a Wi-Fi connectivity.

22. The hub device of claim 19, wherein the device connectivity profile associated with the destination wireless device is manually configured, prior to retrieval, by a customer via a customer portal device that is remote from the hub device.

23. The hub device of claim 19, wherein the device connectivity profile associated with the destination wireless device is automatically configured, prior to retrieval, by a network service provider server that is remote from the hub device.

24. The hub device of claim 19, wherein, when identifying the destination wireless device, the processing unit is further configured to determine a device identifier associated with the destination wireless device; and
- wherein, when accessing the data structure to retrieve the device connectivity profile, the processing unit is further configured to index the data structure with the device identifier to retrieve the device connectivity profile associated with the destination wireless device.

* * * * *